US 7,737,663 B2

(12) United States Patent
Sakurai et al.

(10) Patent No.: US 7,737,663 B2
(45) Date of Patent: Jun. 15, 2010

(54) CHARGING AND DISCHARGING CONTROL CIRCUIT AND CHARGING TYPE POWER SUPPLY DEVICE

(75) Inventors: Atsushi Sakurai, Chiba (JP); Kazuaki Sano, Chiba (JP); Toshiyuki Koike, Chiba (JP)

(73) Assignee: Seiko Instruments Inc., Chiba (JP)

( * ) Notice: Subject to any disclaimer, the term of this patent is extended or adjusted under 35 U.S.C. 154(b) by 200 days.

(21) Appl. No.: 11/835,027

(22) Filed: Aug. 7, 2007

(65) Prior Publication Data

US 2008/0036422 A1    Feb. 14, 2008

(30) Foreign Application Priority Data

Aug. 11, 2006  (JP) ............... 2006-219195

(51) Int. Cl.
*H02J 7/00*  (2006.01)
(52) U.S. Cl. ..................................... 320/134
(58) Field of Classification Search ............... 320/134, 320/136; 361/79, 86, 101, 102
See application file for complete search history.

(56) References Cited

U.S. PATENT DOCUMENTS

| 5,959,436 | A  | * | 9/1999  | Takashina et al. | ........... 320/134 |
| 6,316,915 | B1 | * | 11/2001 | Fujiwara et al.  | ............. 320/134 |
| 6,501,248 | B2 | * | 12/2002 | Fujiwara         | ..................... 320/136 |
| 6,504,345 | B2 | * | 1/2003  | Sakurai et al.   | ............... 320/162 |
| 2001/0052759 | A1 |   | 12/2001 | Sakurai et al. | |

FOREIGN PATENT DOCUMENTS

| JP | 2002-34163     | 1/2002 |
| JP | 2002-238173 A  | 8/2002 |
| JP | 2006-121900    | 5/2006 |

\* cited by examiner

*Primary Examiner*—Edward Tso
*Assistant Examiner*—Ramy Ramadan
(74) *Attorney, Agent, or Firm*—Brinks Hofer Gilson & Lione

(57) ABSTRACT

Provided is a charging and discharging protection circuit realizing low current consumption in an overcurrent detection state, easy calculation of an automatic return impedance, and high usability. A pull-down circuit for pulling down an overcurrent detection terminal to a VSS terminal is connected in series between the overcurrent detection terminal and a switching circuit. The switching circuit is connected in series between the pull-down circuit and the VSS terminal.

9 Claims, 4 Drawing Sheets

CHARGING AND DISCHARGING CONTROL CIRCUIT AND CHARGING TYPE POWER SUPPLY DEVICE

This application claims priority under 35 U.S.C. §119 to Japanese Patent Application No. JP2006-219195 filed Aug. 11, 2006, the entire content of which is hereby incorporated by reference.

BACKGROUND OF THE INVENTION

1. Field of the Invention

The present invention relates to a charging and discharging control circuit for controlling the charging and discharging of a secondary battery and to a charging type power supply device including the charging and discharging control circuit.

2. Description of the Related Art

A charging type power supply device using a secondary battery includes, in order to protect the secondary battery, a charging and discharging control circuit for detecting the overcharging and overdischarging of the secondary battery and an overcurrent flowing into a load to control the charging and discharging of the secondary battery. In order to protect the secondary battery and reduce current consumption, the charging and discharging control circuit has been designed in various ways and a circuit as described in JP 2002-238173 A has been proposed.

FIG. 7 shows a conventional charging type power supply device.

In the conventional charging type power supply device, a current flows from a secondary battery into a load 103 connected between external terminals 105 and 106 through a switching circuit 102. When a voltage at an overcurrent detection terminal 113 connected with the external terminal 106 becomes higher than an overcurrent detection voltage, a charging and discharging control circuit 210 controls to turn OFF the switching circuit 102. This state is referred to as overcurrent detection state.

In the overcurrent detection state, an N-channel transistor 251 of a pull-down circuit 219 and an N-channel transistor 252 of a switching circuit 220 are turned ON. Then, the overcurrent detection terminal 113 is pulled down to a VSS terminal 112 through a resistor 253. After the charging and discharging control circuit 210 enters the overcurrent detection state, when the load 103 is disconnected from the external terminals 105 and 106, a voltage at the overcurrent detection terminal 113 approaches a VSS voltage. When the voltage at the overcurrent detection terminal 113 becomes lower than the overcurrent detection voltage, the charging and discharging control circuit 210 is released from the overcurrent detection state to turn ON the switching circuit 102.

The above-mentioned circuit operation is referred to as automatic return operation. An impedance between the external terminals 105 and 106 at the time of automatic return is referred to as automatic return impedance.

In an overcharging state in which a charger 104 is connected between the external terminals 105 and 106 and a secondary battery 101 has a voltage higher than a predetermined voltage value, the charging and discharging control circuit 210 controls to turn OFF the switching circuit 102. This state is referred to as overcharging detection state.

In the overcharging detection state, the voltage at the overcurrent detection terminal 113 becomes lower than the VSS voltage by the charger 104. Therefore, the charging and discharging control circuit 210 controls to turn OFF the N-channel transistor 252 of the switching circuit 220, thereby preventing a charging current from flowing through the resister 253 and a parasitic diode 254 of a pull-down circuit 219.

However, the conventional charging type power supply device has a problem in that the current consumption is increased by a phenomenon as described below.

FIG. 8 is a cross sectional view showing the pull-down circuit and the switching circuit in the conventional charging and discharging control circuit 210. In the overcurrent detection state, the overcurrent detection terminal 113 is pulled up to a VDD terminal 111 through the external terminal 106, the load 103, and the external terminal 105. Therefore, there is the following problem. A base current flows from the overcurrent detection terminal 113 into a P-well of the N-channel transistor 252. Then, a parasitic bipolar transistor 501 is turned ON and a current flows from the VDD terminal 111 to the VSS terminal 112 through the resistor 253, thereby increasing the current consumption of the charging and discharging control circuit.

For the automatic return, it is necessary to reduce the base current to a value at which the parasitic bipolar transistor 501 is not turned ON. That is, it is necessary to increase the automatic return impedance. However, the switching circuit and the pull-down circuit as described above have a problem in that the calculation of the automatic return impedance is complicated because the automatic return impedance is non-linearly changed by a voltage of the secondary battery 101.

SUMMARY OF THE INVENTION

Therefore, an object of the present invention is to solve the problems and to provide a charging and discharging protection circuit realizing low current consumption in an overcurrent detection state, easy calculation of an automatic return impedance, and high usability.

In order to achieve the object, according to the present invention, a charging and discharging control circuit includes an overcharging detection circuit for monitoring a voltage of a secondary battery to detect whether or not the secondary battery is in an overcharging state, a switching circuit for controlling a connection between the secondary battery and an external terminal, an overcurrent detection circuit for monitoring a current flowing into the switching circuit based on a voltage at an overcurrent detection terminal to detect an overcurrent, a charging and discharging control circuit for controlling a switching of the switching circuit based on a signal from each of the detection circuits, a pull-down circuit controlled by the charging and discharging control circuit, for pulling down the overcurrent detection terminal in an overcurrent detection state, a charger detection circuit, and a switching circuit for disconnecting the pull-down circuit with a VSS terminal in response to a signal from the charger detection circuit when a charger is connected between the pull-down circuit and the VSS terminal.

According to the present invention, it is possible to provide a charging and discharging control circuit realizing low current consumption in the overcurrent detection state, easy calculation of an automatic return impedance, and high usability, and a charging type power supply device including the charging and discharging protection circuit.

DETAILED DESCRIPTION OF THE PREFERRED EMBODIMENTS

First Embodiment

Figure 1:
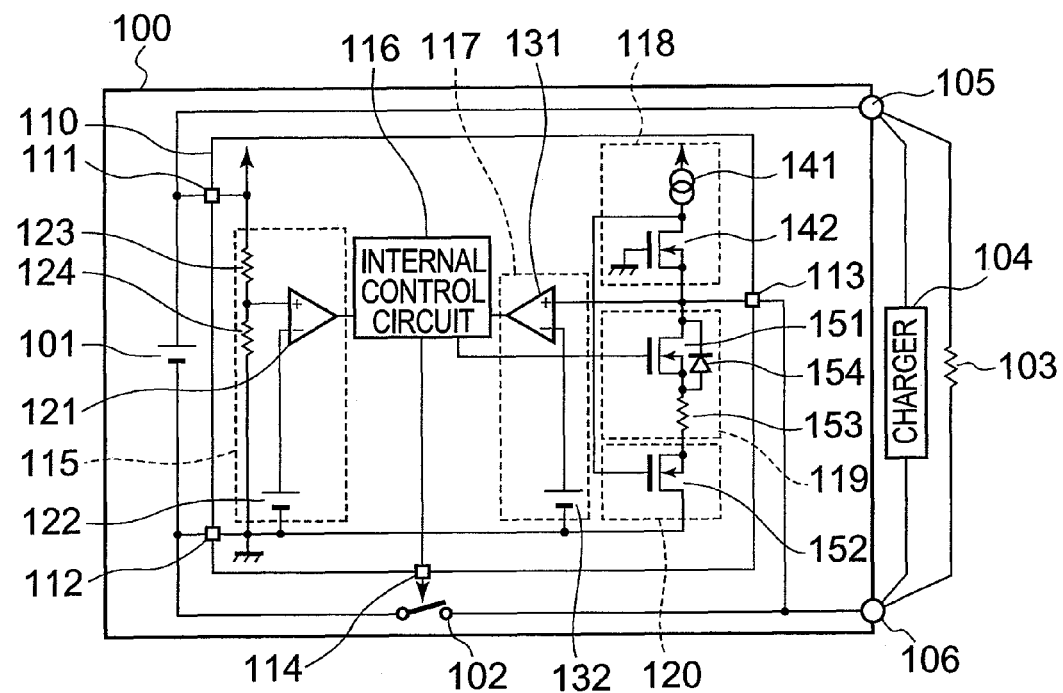
FIG. 1 is a circuit block diagram showing a charging type power supply device according to a first embodiment of the present invention.

FIG. 1 is a circuit block diagram showing a charging type power supply device according to a first embodiment of the present invention.

A charging type power supply device 100 includes a secondary battery 101 which is chargeable and dischargeable, a switching circuit 102 serving as a current adjusting means capable of adjusting charging and discharging currents, external terminals 105 and 106, and a charging and discharging control circuit 110 for controlling the switching circuit 102. A load 103 such as a mobile telephone or a charger 104 is connected between the external terminals 105 and 106.

The charging and discharging control circuit 110 includes a VDD terminal 111 and a VSS terminal 112 which are connected with the secondary battery 101, an output terminal 114 which is a control terminal of the switching circuit 102, an overcurrent detection terminal 113 and an overcurrent detection circuit 117 which are used for overcurrent detection, an overcharging detection circuit 115, an internal control circuit 116 for controlling the switching circuit 102 based on signals from the detection circuits, a charger detection circuit 118, a pull-down circuit 119, and a switching circuit 120. The overcharging detection circuit 115 includes a comparator 121, a reference voltage circuit 122, and resistors 123 and 124. The overcurrent detection circuit 117 includes a comparator 131 and a reference voltage circuit 132. The charger detection circuit 118 includes a constant current circuit 141 and an N-channel transistor 142. The pull-down circuit 119 includes an N-channel transistor 151, a parasitic diode 154, and a resistor 153. The switching circuit 120 includes an N-channel transistor 152.

In the charging type power supply device having the above-mentioned structure, when the load 103 is connected between the external terminals 105 and 106, a current corresponding to the load flows into the switching circuit 102. In an overcurrent state in which a voltage at the overcurrent detection terminal 113 connected with the external terminal 106 is higher than a voltage of the reference voltage circuit 132, a detection signal is output from the comparator 131 to the internal control circuit 116. The internal control circuit 116 outputs a control signal to the switching circuit 102 through the output terminal 114 to stop the discharging. This state is referred to as overcurrent detection state. In some cases, the internal control circuit 116 generates a control signal delayed by a predetermined delay time.

In the overcurrent detection state, the N-channel transistor 151 of the pull-down circuit 119 and the N-channel transistor 152 of the switching circuit 120 are turned ON. Then, the overcurrent detection terminal 113 is pulled down to the VSS terminal 112 through the resistor 153. Therefore, after the charging and discharging control circuit 110 enters the overcurrent detection state, when the load 103 is disconnected from the external terminals 105 and 106, the voltage at the overcurrent detection terminal 113 approaches a voltage at the VSS terminal. When the voltage at the overcurrent detection terminal 113 becomes lower than the voltage of the reference voltage circuit 132, the overcurrent detection state is released. This operation is referred to as automatic return operation and an impedance between the external terminals 105 and 106 at the time of automatic return is referred to as automatic return impedance.

When the charger 104 is connected between the external terminals 105 and 106, a detection signal is output from the comparator 121 to the internal control circuit 116 in an overcharging state in which a voltage obtained by dividing a voltage of the secondary battery 101 by the resistors 123 and 124 is higher than a voltage of the reference voltage circuit 122. The internal control circuit 116 outputs a control signal to the switching circuit 102 through the output terminal 114 to stop the charging. This state is referred to as overcharging detection state. In some cases, the internal control circuit 116 generates a control signal delayed by a predetermined delay time.

In the overcharging detection state, the voltage at the overcurrent detection terminal 113 becomes lower than a voltage at the VSS terminal 112 by the charger 104, so the N-channel transistor 142 is turned ON to pull down a drain of the N-channel transistor 142 which is pulled up in the constant current circuit 141 to the voltage at the overcurrent detection terminal 113. Therefore, the N-channel transistor 152 of the switching circuit 120 is turned OFF to prevent a charging current from flowing through the resister 153 and the parasitic diode 154 of the pull-down circuit 119. In some cases, the output terminal 114 and the switching circuit 102 are provided for each of charging and discharging.

Figure 2:
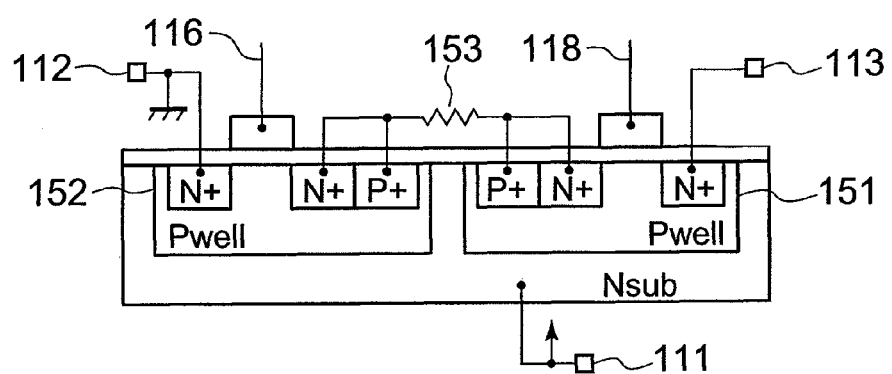
FIG. 2 is a cross sectional view showing a pull-down circuit and a switching circuit in a charging and discharging control circuit according to the first embodiment of the present invention.

FIG. 2 is a cross sectional view showing the pull-down circuit and the switching circuit in the first embodiment.

In the overcurrent detection state, the overcurrent detection terminal 113 is pulled up to the VDD terminal 111 by the load 103. At this time, the N-channel transistor 151 is being turned ON, so a current flows into the N-channel transistor 152 through the resistor 153. However, the N-channel transistor 152 is also being turned ON, so a voltage of a P-well thereof becomes equal to the voltage at the VSS terminal 112. Therefore, a parasitic bipolar transistor is not turned ON, with the result that the current consumption of the charging and discharging control circuit does not increase.

Because the parasitic bipolar transistor is not turned ON, the automatic return impedance is simply expressed by the following expression.

$$RZ = (VDD/VREF - 1) \times RPD \quad \text{(Expression 1)}$$

where RZ denotes the automatic return impedance, VDD denotes the voltage of the secondary battery 101, VREF denotes the voltage of the reference voltage circuit 132, and RPD denotes a resistance value of the pull-down circuit 119.

Therefore, according to the first embodiment as described above, it is possible to provide a charging and discharging control circuit realizing low current consumption in an overcurrent detection state, easy calculation of an automatic return impedance, and high usability, and a charging type power supply device including the charging and discharging protection circuit.

Second Embodiment

Figure 3:
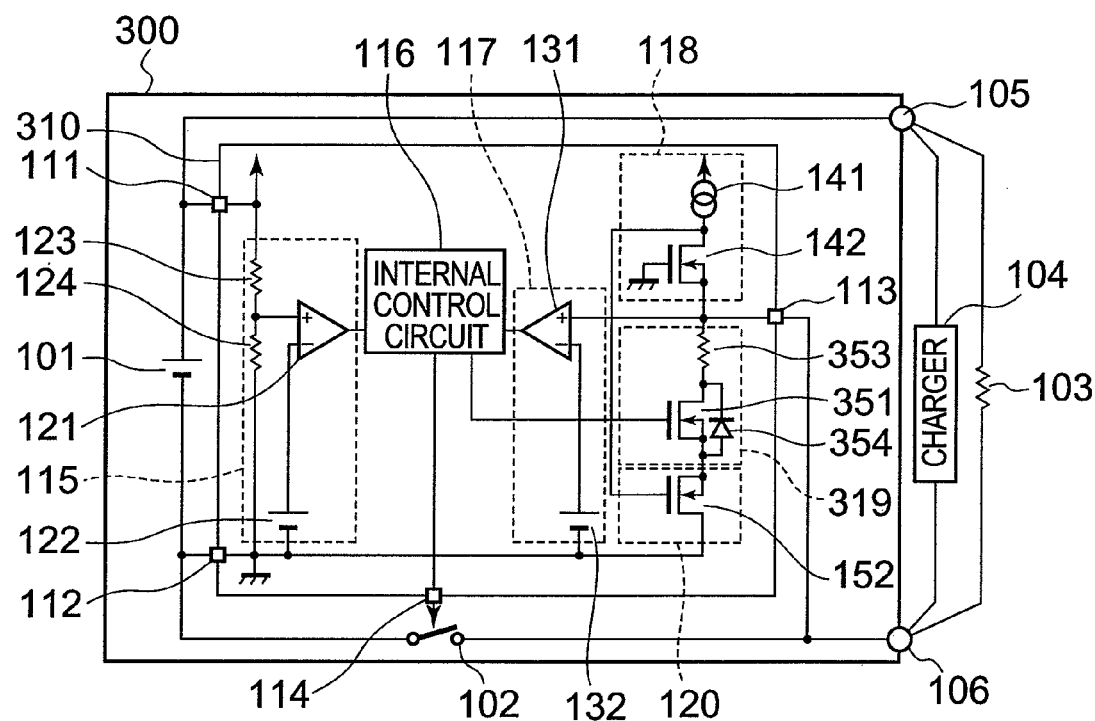
FIG. 3 is a circuit block diagram showing a charging type power supply device according to a second embodiment of the present invention.

FIG. 3 is a circuit block diagram showing a charging type power supply device according to a second embodiment.

A connection relationship in a pull-down circuit 319 is different from that in the pull-down circuit 119 of the charging type power supply device according to the first embodiment. That is, the overcurrent detection terminal 113 is connected with a resistor 353. The resistor 353 is connected with an N-channel transistor 351 and a parasitic diode 354. The other structures and detection operations are identical to those of the charging type power supply device according to the first embodiment.

Figure 4:
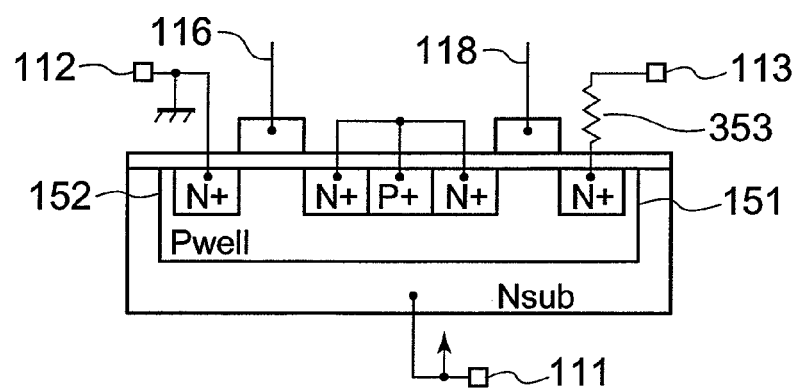
FIG. 4 is a cross sectional view showing a pull-down circuit and a switching circuit in a charging and discharging control circuit according to the second embodiment of the present invention.

FIG. 4 is a cross sectional view showing the pull-down circuit and the switching circuit in the second embodiment.

In the overcurrent detection state, the overcurrent detection terminal 113 is pulled up to the VDD terminal 111 by the load 103. At this time, the N-channel transistor 351 is being turned ON, so a current flows into the N-channel transistor 152 through the resistor 353. However, the N-channel transistor 152 is also being turned ON, so a voltage of a P-well becomes equal to the voltage at the VSS terminal 112. Therefore, a parasitic bipolar transistor is not turned ON, with the result that the current consumption of the charging and discharging control circuit does not increase.

Thus, the same effect as that in the first embodiment can be obtained. The P-well can be commonly used for the pull-down circuit and the switching circuit as shown in FIG. 4, so a circuit area can be reduced.

Third Embodiment

Figure 5:
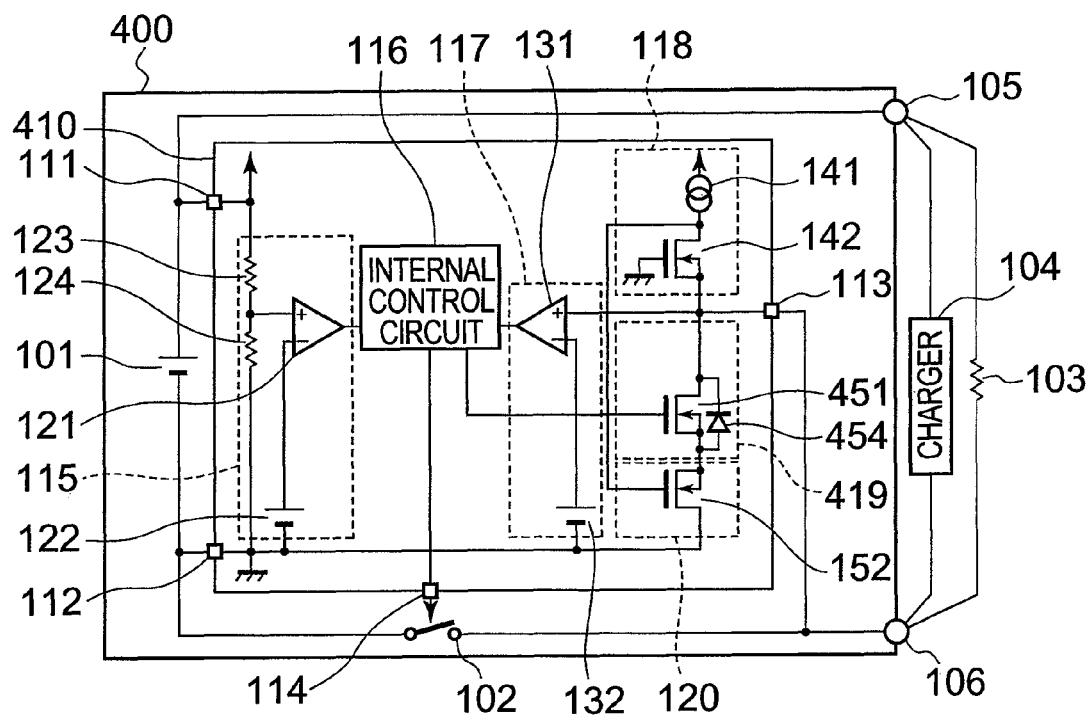
FIG. 5 is a circuit block diagram showing a charging type power supply device according to a third embodiment of the present invention.

FIG. 5 is a circuit block diagram showing a charging type power supply device according to a third embodiment.

A structure of a pull-down circuit 419 is different from that of the pull-down circuit 119 of the charging type power supply device according to the first embodiment. That is, the pull-down circuit 419 is composed only of an N-channel transistor 451 and a parasitic diode 454. In stead of the resistor 153, a size of the N-channel transistor 451 is adjusted to obtain a predetermined resistance value. The other structures and detection operations are identical to those of the charging type power supply device according to the first embodiment.

Figure 6:
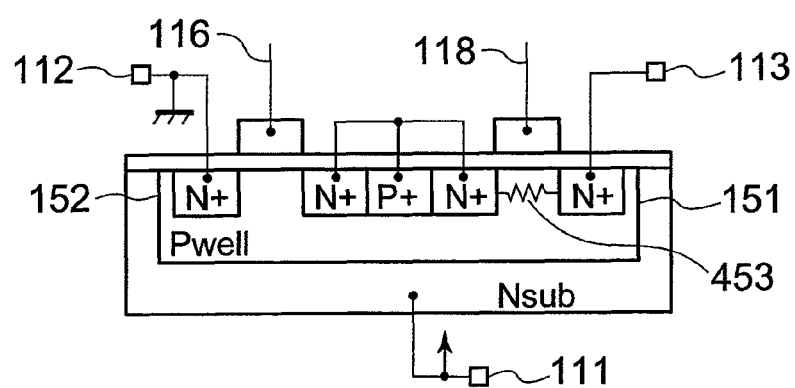
FIG. 6 is a cross sectional view showing a pull-down circuit and a switching circuit in a charging and discharging control circuit according to the third embodiment of the present invention.
Figure 7:
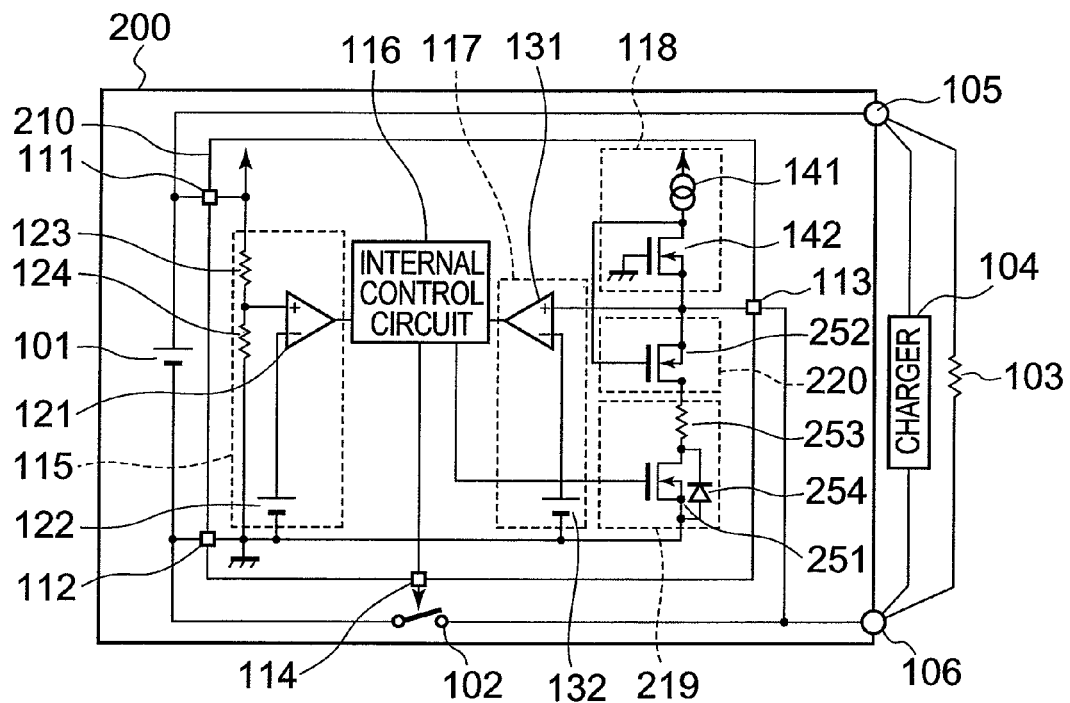
FIG. 7 is a circuit block diagram showing a conventional charging type power supply device.
Figure 8:
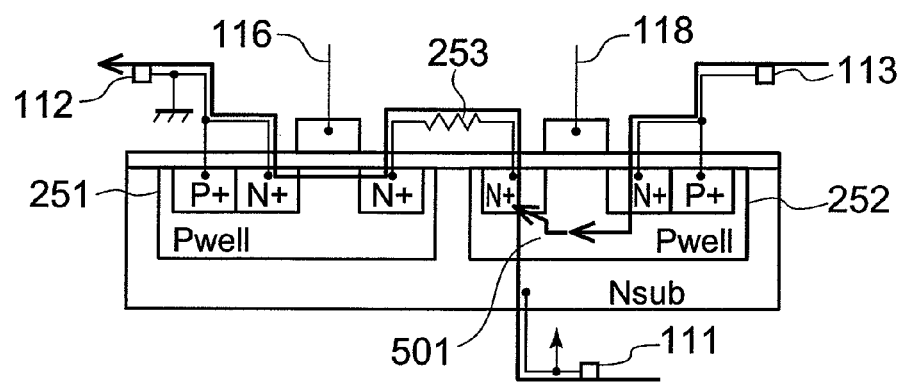
FIG. 8 is a cross sectional view showing a pull-down circuit and a switching circuit in a conventional charging and discharging control circuit.

FIG. 6 is a cross sectional view showing the pull-down circuit and the switching circuit in the third embodiment.

In the overcurrent detection state, the overcurrent detection terminal 113 is pulled up to the VDD terminal 111 by the load 103. At this time, the N-channel transistor 451 is being turned ON, so a current flows into the N-channel transistor 152. However, the N-channel transistor 152 is also being turned ON, so a voltage of a P-well becomes equal to the voltage at the VSS terminal 112. Therefore, a parasitic bipolar transistor is not turned ON, with the result that the current consumption of the charging and discharging control circuit does not increase.

Thus, the same effect as that in the first embodiment can be obtained. The P-well can be commonly used for the pull-down circuit and the switching circuit as shown in FIG. 6, so a circuit area can be reduced.

What is claimed is:

1. A charging and discharging control circuit for monitoring one of a voltage and a current of a secondary battery to control a connection between an external terminal and the secondary battery, comprising:

an overcurrent detection circuit for monitoring a voltage at an overcurrent detection terminal to detect an overcurrent state;

a control circuit for controlling the connection between the external terminal and the secondary battery based on an output from the overcurrent detection circuit;

a pull-down circuit connected with the overcurrent detection terminal, for connecting the overcurrent detection terminal with a VSS terminal at a predetermined resistance value in the overcurrent state, the pull-down circuit comprising:

a resistor; and a first N-channel transistor comprising a drain coupled to the overcurrent detection terminal and a source coupled to the resistor;

a charger connection detection circuit connected with the overcurrent detection terminal, for detecting whether or not a charger is connected with the external terminal; and a switching circuit controlled in response to an output from the charger connection detection circuit, the switching circuit comprising a second N-channel transistor comprising a source coupled to the resistor of the pull-down circuit and a drain coupled to the VSS terminal, wherein the resistor is connected between the sources of the first and second N-channel transistors.

2. The charging and discharging control circuit according to claim 1, wherein the first N-channel transistor further comprises a gate connected with the control circuit.

3. The charging and discharging control circuit according to claim 1, wherein a source voltage and a substrate voltage of the first N-channel transistor and a source voltage and a substrate voltage of the second N-channel transistor are equal to one another.

4. A charging type power supply device, comprising:

an external terminal connected with one of a load and a charger;

a secondary battery which is chargeable and dischargeable and connected with the external terminal;

a charging and discharging control switch connected between the external terminal and the secondary battery; and the charging and discharging control circuit according to claim 1, for monitoring one of the voltage and the current of the secondary battery to control the charging and discharging control switch.

5. The charging and discharging control circuit according to claim 1, wherein the charger connection detection circuit comprising a third N-channel transistor comprising a source connected directly to the drain of the first N-channel transistor and to the overcurrent detection terminal.

6. A charging and discharging control circuit for monitoring one of a voltage and a current of a secondary battery to control a connection between an external terminal and the secondary battery, comprising:
   an overcurrent detection circuit for monitoring a voltage at an overcurrent detection terminal to detect an overcurrent state;
   a control circuit for controlling the connection between the external terminal and the secondary battery based on an output from the overcurrent detection circuit;
   a pull-down circuit connected with the overcurrent detection terminal, for connecting the overcurrent detection terminal with a VSS terminal at a predetermined resistance value in the overcurrent state, the pull-down circuit comprising:
      a first N-channel transistor comprising a drain and a source; and
      a resistor connected between the overcurrent detection terminal and the drain of the first N-channel transistor;
   a charger connection detection circuit connected with the overcurrent detection terminal, for detecting whether or not a charger is connected with the external terminal; and
   a switching circuit controlled in response to an output from the charger connection detection circuit, the switching circuit comprising a second N-channel transistor comprising a source coupled to the source of the first N-channel transistor and a drain coupled to the VSS terminal.

7. The charging and discharging control circuit according to claim 6, wherein the first N-channel transistor further comprises a gate connected with the control circuit.

8. The charging and discharging control circuit according to claim 6, wherein a source voltage and a substrate voltage of the first N-channel transistor and a source voltage and a substrate voltage of the second N-channel transistor are equal to one another.

9. The charging and discharging control circuit according to claim 6, wherein the charger connection detection circuit comprising a second N-channel transistor comprising a source connected directly to the resistor of the pull-down circuit and to the overcurrent detection terminal.

* * * * *